Aug. 25, 1925. 1,550,782
A. CLARK
PORTABLE RADIATOR
Filed Aug. 30, 1923 2 Sheets-Sheet 1
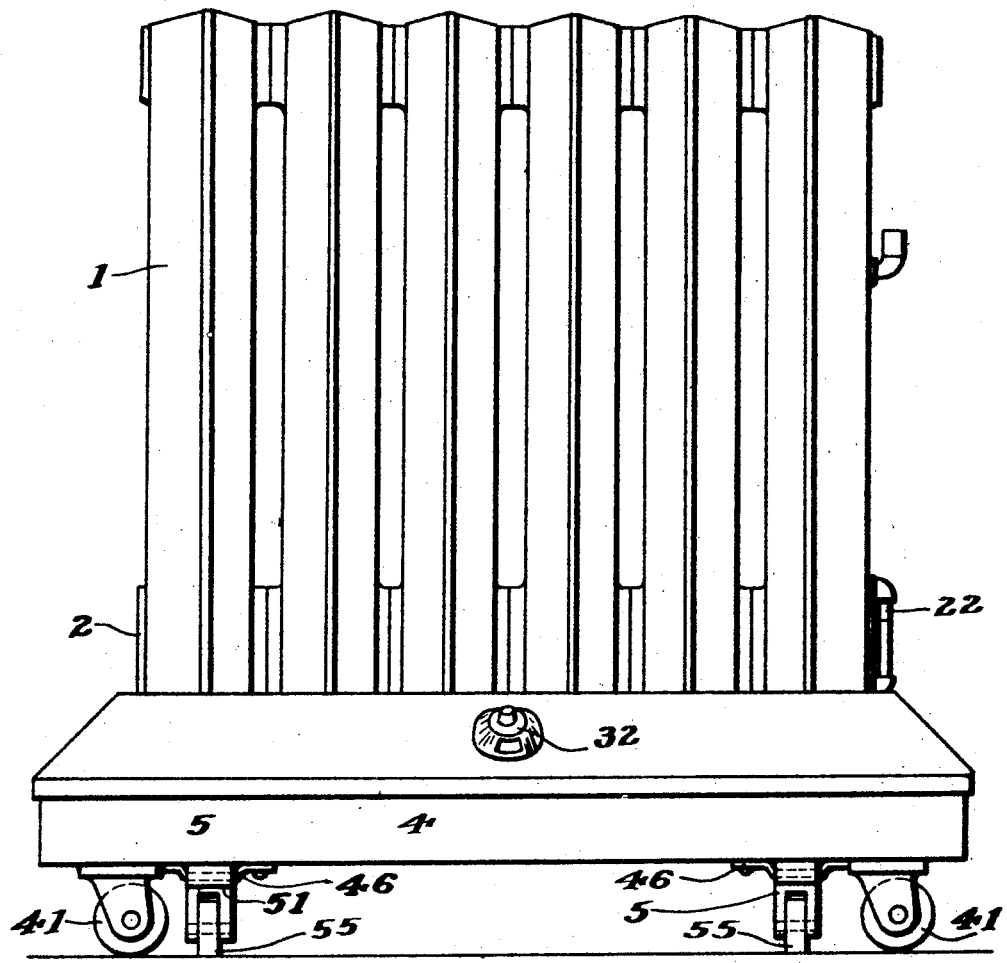
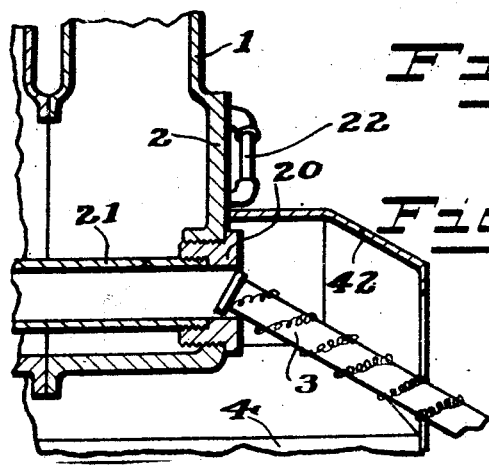
Fig-1
Fig-4
Inventor
Allan Clark
By H.L. & C.L. Reynolds
Attorneys

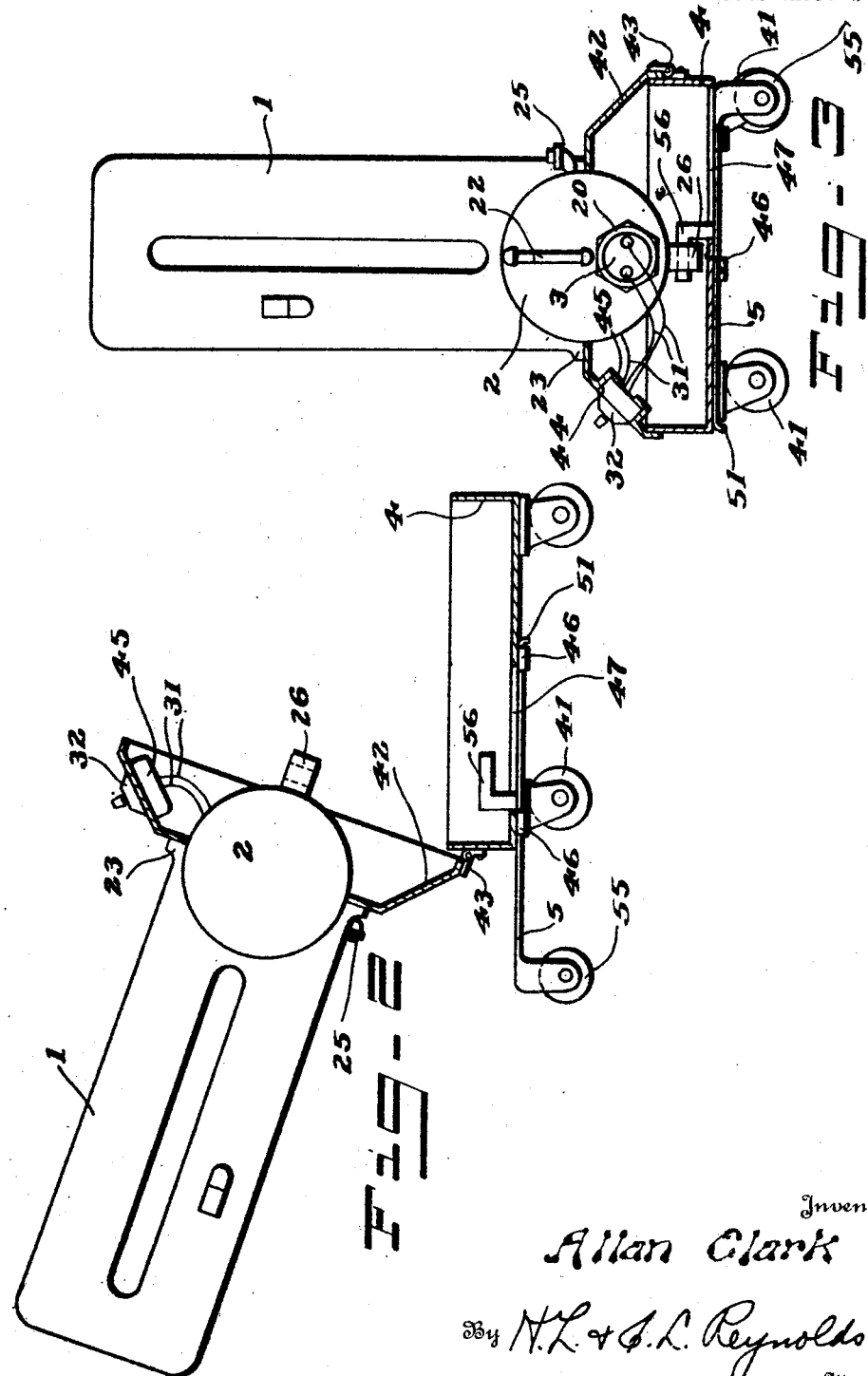

Patented Aug. 25, 1925.

1,550,782

UNITED STATES PATENT OFFICE.

ALLAN CLARK, OF SEATTLE, WASHINGTON.

PORTABLE RADIATOR.

Application filed August 30, 1923. Serial No. 660,078.

*To all whom it may concern:*

Be it known that I, ALLAN CLARK, a citizen of the United States of America, and resident of the city of Seattle in the county of King and State of Washington, have invented certain new and useful Improvements in Portable Radiators, of which the following is a specification.

My invention relates to heating apparatus which is designed for use in heating rooms and buildings, either as the sole heating means or as an auxiliary to another main heating plant. My invention relates particularly to steam radiators which are or may be portable, that is, movable from place to place so that the heat may be generated and delivered to the room at any point therein which it may be desired to heat.

My invention relates to that type of portable steam radiators employing, preferably, an electrically energized heating element as the means for heating water to generate steam and in which the heating element, the boiler and the radiating surfaces are mounted as a unit upon a mobile casing or stand, the said casing partially enclosing portions of this heating unit.

It is particularly my object in the present invention to provide a suitable casing for such a portable radiator which will securely support the heating unit, which will enclose portions which it is not desired to leave exposed, and in which the several parts can be quickly and easily reached when necessary.

A further object is the provision in such a portable radiator of means which will permit inspection and attention to parts normally enclosed with ease and without tipping over the lower portion of the casing, that is, that portion normally next to the floor.

Other objects may be ascertained from a study of this specification and of the drawings forming a part thereof, and of the claims terminating the specification.

My invention comprises those novel parts and combinations thereof which are shown in the accompanying drawings, described in the specification, and particularly defined by the claims terminating the same.

In the accompanying drawings I have shown my invention in the form which is now preferred by me, it being understood, however, that changes from the precise form shown and described may be made, within the scope of the appended claims.

Figure 1 is a front elevation of my improved heating apparatus, parts being shown in their normal operative position.

Figure 2 is an end elevation of the heating apparatus, the casing and its cover being shown in section, and parts being shown in the position they would occupy when the heating unit is made accessible for inspection.

Figure 3 is a view similar to Figure 2, showing parts in their normal position, or as in Figure 1.

Figure 4 is a detail section through an end of my casing and boiler showing the manner of extracting the heating element.

Essentially my invention comprises a heating unit, including a boiler or other means for generating steam, a heating element therefor, preferably electrical, and a heat radiating device, ordinarily called a radiator, into which the steam from the boiler passes and by means of which heat is delivered to the air of the room, and also a casing forming a base for such a heating unit, by means of which it is portable or mobile. For the purposes of this invention the heating element for the boiler may be any which is suitable or desirable, although I prefer that this be an electric heating element, because of its simplicity and convenience, and have so illustrated it.

The drawings illustrate the radiator 1 as having in its base a boiler 2, the boiler and radiator being formed integral or permanently connected together so that steam generated within the boiler is delivered directly to the columns of the radiator. An end of the boiler is shown as pierced and within the opening so formed is secured a bushing 20. This bushing supports a tube 21 which extends within the boiler and which is closed except at the end which is connected in the bushing, as is best shown in Figure 4. Within this tube 21, and entering through its open end and through the bushing 20, is fitted a heating element generally designated by the numeral 3. This heating element may be of any suitable design and is connected by leads 31 to a switch 32. A water gage glass 22 may be connected to the boiler 2 if desired, and a suitable filling opening 25 is provided. Cleanout plugs may be provided if necessary or desirable, their provision and location being purely a matter of design.

The radiator 1, the boiler 2, and the heating element 3, are so constructed and arranged relatively, that they form a single heating unit which is compact and which may be handled as a single element. This I mount in a suitable mobile casing in such a manner that while portions of this unit may be concealed within the casing and the major portion projects above the casing, yet the concealed portion is readily accessible for inspection. The casing is mounted upon casters 41, or their equivalents, by means of which it may be moved from place to place. If the device were of small size, legs might be substituted for these casters, and the entire apparatus would then be lifted to carry it from place to place. The casing comprises a base 4 and a cover 42, hinged upon it along an edge, as at 43, and to the cover 42 is connected the heating unit. I have shown a switch 32 as mounted in the cover 42 in a hole 44, formed therein by cutting the material along radial lines, the material being bent inward and downward towards the center of the hole 44, as is indicated at 45, to form a support for this switch 32.

The cover and heating unit are connected together in any suitable manner, and I have shown a footing 23 upon the radiator 1, resting upon the upper side of the cover 42. It is largely immaterial whether the base 4 directly supports the weight of the heating unit, or supports it indirectly, from the cover. It is only essential that the heating unit be secured to move with the cover, and that it be not permanently connected directly to the base. The cover has a hole in its upper side, through which a portion of the boiler 2 passes so that that portion which carries the heating element 3 is concealed beneath the cover 42 and lies within the base 4.

My object in thus enclosing the heating element is three-fold. In the first place, it is desirable that it be protected against injury and that persons near the radiator be protected against being burnt thereby. This might be done by completely closing the tube 21, if its end were exposed, but inasmuch as these elements occasionally burn out, and it may be necessary for one not skilled as a mechanic and not possessed of proper tools to replace a burned out element, it is not desirable to so enclose the heating element that its replacement is at all difficult. The second reason for thus enclosing the element, then, is to hide it from sight (it being not harmonious in appearance with the radiator or other furnishings of a room) without rendering it difficult of access. The third object is to surround it with a body of stagnant air. I have found that when exposed in an open room, or when free access of the air in a room is had to this element, this air is put in circulation, and the boiler heats quite slowly, due to convection currents carrying away heat from the element as uncontrolled currents.

It will be evident from the above description that the heating unit completely assembled, and including even the switch 32, may be attached to the cover and handled with the latter, irrespective of the base. Thus, it may be attached to the cover during manufacture and only connected to the base when about to be placed in service. It will be seen, also, that the heating element 3 is concealed beneath the cover 42 and is protected thereby. However, such heating elements will occasionally burn out, and for this reason, and to give access to the portion of the boiler which is concealed beneath the cover 42, it is essential that the cover be not permanently secured upon the base 4, so as to be immovable relative thereto. For example, the filling opening 25 might be concealed beneath the cover 42, and only accessible when the cover is raised. It is for such reasons that the hinge connection shown at 43 is provided, although it will be evident that another suitable connection might be substituted for the particular type shown.

When parts are in the normal position, as shown in Figures 1 and 3, the center of gravity of the heating unit, which is the heaviest part of the apparatus, lies above and within the geometrical figure or pattern formed by the casters 41. In other words, a line dropped vertically downward from the center of gravity of the device would lie within the pattern of the casters 41. When it is desired to have access to the portions beneath the cover 42, however, it is necessary to tip the cover 42 and consequently the heating unit attached thereto, as is shown in Figure 2. This moves the center of gravity as the cover and heating unit are tilted, and due to the connection of the cover along an edge of the base this would tend to tilt the base at the same time as the center of gravity moves outward beyond the casters 41. This would render the entire device unstable, and would seriously interfere with the necessary work to be done.

In order to prevent such tilting of the base, and consequent upsetting of the entire device, I have provided legs 5 which are connected to the base and which may be extended to form a support for the device outward of the hinge connection 43 from the adjacent casters 41. As many of the legs 5 may be provided as seems desirable, and I have shown two of them. They may or may not have casters 55 on them, but I prefer to provide such casters, to prevent catching of the legs on carpets, rugs, and the like. They should ordinarily not project beyond the limits of the base 4, and yet when it is desired to tilt the heating unit, they should be extended outward. I have therefore provided guides 46 upon the bottom of the base 4, in which the legs 5 slide. One end may be turned down, as indicated at 51, to limit the extension of the leg and to retain it always within the guides 46.

The caster 55, on each leg 5 extends downward therefrom to form a foot and lies substantially in the plane of the casters 41, that is, it extends substantially to the floor upon which the casters 41 roll. When these legs and their feet are projected, they form, together with the adjacent casters 41, a support which substantially includes the center of gravity of the heating unit, as it moves outwardly in tilting. At least, the figure formed by these feet and the adjacent casters always includes the hinge connection 43, which is the point of application to the base 4 of so much of the weight of the heating unit as is not supported near its top by the operator, or by some other support. These legs 5 therefore will serve when projections substantially to prevent tilting of the base 4. When the legs are not required for this purpose, they may be retracted beneath the base, as is shown in Figure 3, thus enabling the device to be pushed close to a wall or to be moved through narrow spaces.

If no lock were provided for the cover 42, an accidental push might tip over the heating unit and cover. Further, it is desirable that the radiator unit and cover should not be purposely tipped over unless the legs 5 have been drawn out to prevent tipping of the base 4. To these ends I provide a lock for the cover which is released only when the legs 5 are drawn out. This is conveniently done by providing a perforated lug 26 which depends from the cover 42, or as shown from the boiler 2, within the casing 4, and which is engaged by a catch 56 upon one or more of the legs 5, projecting upward into the base 4 through a slot 47 in its bottom. The construction and arrangement of this lock may be varied considerably, the essential idea being that the lock shall not be released until the leg 5 has been drawn out. By making the catch sufficiently long, it may be insured that the cover and attached heating unit will not be released until the foot has been drawn out a predetermined amount.

What I claim as my invention is:

1. In combination with a self-contained heating unit comprising a radiator, a boiler, and a heating element, a stand therefor comprising a mobile base, a cover hinged thereon, the heating unit and cover being secured together, and an auxiliary support carried by said base and adapted when in operative position to prevent tipping of the base when the heating unit and cover are tilted relative to the base.

2. In combination with a self-contained heating unit comprising a radiator and steam generating means connected thereto, a stand therefor comprising a mobile base, a cover hinged thereon, the heating unit being secured upon said cover, and auxiliary legs normally retracted beneath said base, and projectable therefrom to prevent tipping thereof when the heating unit and cover are tilted relative to the base.

3. In combination with a self-contained heating unit comprising a radiator and steam-generating means connected thereto, a stand therefor comprising a mobile base, a cover hinged thereon, the heating unit being secured upon and partly extending beneath said cover, and an auxiliary support secured to said base and movable into operative position outwardly beyond the hinge connection of the base and cover to prevent tipping of the base when the heating unit and cover are tilted relative to the base.

4. A portable heating apparatus comprising, in combination, a mobile base, casters therebeneath forming the normal support of said base, a cover connected to said base, and connected thereto to move towards the vertical plane including one side thereof, a heating unit comprising a radiator and steam generating means therefor secured to said cover and normally supported thereby with its center of gravity substantially over the center of said base, said heating unit being movable with said cover to shift the center of gravity of said heating unit outwardly of a vertical plane including two supporting casters at a common side of the base, and an auxiliary support connected to said base and movable outwardly therefrom to prevent tilting of the base upon movement of the heating unit and cover.

5. A portable heating apparatus comprising, in combination, a mobile base, a cover hinged thereto along an edge, casters forming the normal support of said base, a heating unit comprising a radiator and a steam generating means therefor secured to said cover and tilting therewith, guides secured beneath said base, and a leg carrying a foot and slidable in said guides to project said foot from its normal position beneath the base to a position outwardly of the base.

6. In combination with a heating unit and a supporting base therefor, said casing having a cover hinged to the base along an edge, and the heating unit being connected to swing with said cover, a retractible auxiliary support connected with said base and adapted to be drawn out therefrom to prevent tilting of the base when the cover and heating unit are tipped, and means for locking said cover to the base and releasable only as said auxiliary support is drawn out into operative position.

7. In combination with a heating unit and a supporting base therefor, said base having a cover hinged to the base along an edge, and the heating unit being connected to swing with said cover, a leg slidable in the bottom of said base, and projectable therefrom to form an auxiliary support therefor, a catch within the base movable with said leg, and a lug within the base connected to swing with the cover and engageable by said catch, and releasable therefrom as the leg is projected.

Signed at Seattle, King County, Washington, this 24th day of August 1923.

ALLAN CLARK.